US011554512B2

(12) United States Patent
Xu et al.

(10) Patent No.: US 11,554,512 B2
(45) Date of Patent: Jan. 17, 2023

(54) VARIABLE-FREQUENCY ULTRASONIC MACHINING SYSTEM FOR COMPUTER NUMERICAL CONTROL MILLING MACHINE

(71) Applicant: Nanjing University of Aeronautics and Astronautics, Nanjing (CN)

(72) Inventors: Juan Xu, Nanjing (CN); Hengchang Wang, Nanjing (CN); Hongfu Zuo, Nanjing (CN); Weiqing Huang, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 275 days.

(21) Appl. No.: 17/014,648

(22) Filed: Sep. 8, 2020

(65) Prior Publication Data

US 2021/0299901 A1 Sep. 30, 2021

(30) Foreign Application Priority Data

Mar. 27, 2020 (CN) .......................... 202010230353.6

(51) Int. Cl.
| | | |
|---|---|---|
| *B26D 7/08* | (2006.01) | |
| *B26D 5/00* | (2006.01) | |
| *B23C 1/00* | (2006.01) | |

(52) U.S. Cl.
CPC ................ *B26D 7/086* (2013.01); *B23C 1/00* (2013.01); *B26D 5/005* (2013.01); *B23C 2270/10* (2013.01)

(58) Field of Classification Search
CPC ............ B23Q 17/0966; B23Q 17/0985; B23C 2270/10; B23C 2260/76; B23C 3/00;
(Continued)

(56) References Cited

U.S. PATENT DOCUMENTS

| 3,634,664 A | * | 1/1972 | Valek | ..................... B23Q 15/12 |
| | | | | 318/591 |
| 10,118,232 B2 | * | 11/2018 | Zhang | ...................... B24B 1/04 |

(Continued)

FOREIGN PATENT DOCUMENTS

| CN | 1611307 A | * | 5/2005 |
| CN | 100999058 B | * | 9/2010 |

(Continued)

*Primary Examiner* — Boyer D Ashley
*Assistant Examiner* — Reinaldo A Vargas Del Rio
(74) *Attorney, Agent, or Firm* — HEA Law PLLC; Darrin A. Auito

(57) ABSTRACT

A variable-frequency ultrasonic machining system for a computer numerical control milling machine including a cutting force detection unit, a temperature sensing unit and a processor. The processor receives sensing signals of the cutting force detection unit and the temperature sensing unit, processes the received sensing signals according to a set program, and sends control signals to an ultrasonic drive power supply and a corresponding servo motor, respectively. By adjusting the ultrasonic vibration frequency or the frequency of the frequency converter of the CNC milling machine in the machining process, the system ensures the continuity of ultrasonic-assisted milling of a part with a complex curved surface in case of uneven cutting allowance, and improves efficiency of ultrasonic machining.

14 Claims, 5 Drawing Sheets

(58) Field of Classification Search
CPC ... B23B 37/00; B23B 2270/10; B23B 29/125; B23B 2260/1285
See application file for complete search history.

(56) References Cited

U.S. PATENT DOCUMENTS

| | | | | |
|---|---|---|---|---|
| 10,179,386 | B2* | 1/2019 | Khosla | G01L 3/1457 |
| 10,245,652 | B2* | 4/2019 | Mann | B23Q 11/1023 |
| 10,493,853 | B2* | 12/2019 | Widmer | B60L 50/66 |
| 2003/0001456 | A1* | 1/2003 | Kauf | B06B 3/00 |
| | | | | 310/323.18 |
| 2003/0085632 | A1* | 5/2003 | Take | B23B 37/00 |
| | | | | 310/323.19 |
| 2010/0158307 | A1* | 6/2010 | Kubota | B23B 37/00 |
| | | | | 381/400 |
| 2019/0201037 | A1* | 7/2019 | Houser | A61B 18/1233 |

FOREIGN PATENT DOCUMENTS

| | | | | | |
|---|---|---|---|---|---|
| CN | 201976058 | U | * | 9/2011 | |
| CN | 108436186 | A | * | 8/2018 | B23D 79/00 |
| FR | 2978932 | A1 | * | 2/2013 | B23Q 15/12 |
| JP | WO2014111973 | A1 | * | 1/2017 | B23B 37/00 |
| TW | 200427545 | A | * | 12/2004 | B23Q 16/021 |

* cited by examiner

VARIABLE-FREQUENCY ULTRASONIC MACHINING SYSTEM FOR COMPUTER NUMERICAL CONTROL MILLING MACHINE

CROSS-REFERENCE TO RELATED APPLICATIONS

This application claims priority to Chinese application number 202010230353.6, filed Mar. 27, 2020, with a title of VARIABLE-FREQUENCY ULTRASONIC MACHINING SYSTEM FOR COMPUTER NUMERICAL CONTROL MILLING MACHINE. The above-mentioned patent application is incorporated herein by reference in their entirety.

TECHNICAL FIELD

The present invention relates to a variable-frequency ultrasonic machining system for a computer numerical control (CNC) milling machine.

BACKGROUND

Compared with the traditional machining process, ultrasonic-assisted cutting (UAC) has high processing efficiency for difficult-to-machine materials and workpieces, and has been widely used in aerospace, medical and other industries. In the existing ultrasonic-assisted milling (UAM), during the one-time clamping, continuous machining process, the frequency and amplitude of the ultrasonic vibration and the speed and feed of the computer numerical control (CNC) machine are constant, regardless of the complex surface of the part and the worn tool. This process has a good effect in machining a part with a flat surface, small tool wear and even cutting allowance. In the case of a complex curved surface, uneven cutting allowance and rapid tool wear, due to the non-periodical change in the cutting angle of the machining tool, the thickness of the cut metal layer and the cutting force both vary. If the speed and feed of the machine tool and the frequency and amplitude of the ultrasonic vibration remain unchanged, the cutting force in the cutting zone of the tool will gradually increase. When the energy accumulates to a value beyond the maximum set parameter of ultrasonic machining, the surface machining accuracy of the workpiece will be reduced, and the tool will be broken in severe cases. To solve this problem, sectional machining is adopted. The surface of the part is divided into different sections, and different cutting parameters and ultrasonic amplitude and frequency are set according to the desired shape of each section. This method is time-consuming and labor-intensive, resulting in low machining efficiency and high labor cost.

SUMMARY

In order to solve the above problems of ultrasonic machining in the prior art, an objective of the present invention is to provide a variable-frequency ultrasonic machining system for a computer numerical control (CNC) milling machine. This system has high machining efficiency and low cost. The system includes:
 a frame;
 a vertical spindle, rotatably provided on the frame;
 a spindle servo motor, for driving the vertical spindle;
 a worktable, provided below the vertical spindle, for clamping a workpiece and driving the workpiece to perform feed motion;
 a feed servo motor, for driving the worktable to perform the feed motion;
 a milling cutter shaft; and
 a milling cutter connected to the milling cutter shaft;
 where, the system further includes:
 a connecting shaft, connected to the vertical spindle;
 a wireless transmission transmitting winding unit, fixed around the connecting shaft;
 a wireless transmission receiving winding unit, connected to the connecting shaft, and spaced apart from the wireless transmission transmitting winding unit located above;
 a cutter shaft drive motor, connected under the wireless transmission receiving winding unit and having a hollow shaft, where power of the cutter shaft drive motor is connected from the wireless transmission receiving winding unit and introduced through a cavity of the hollow shaft;
 a transducer, connected to the shaft of the cutter shaft drive motor, where power of the transducer is connected from the wireless transmission receiving winding unit and introduced through the hollow shaft of the cutter shaft drive motor;
 a horn, where an upper end of the horn is connected to the transducer, and a lower end thereof is connected to the milling cutter shaft;
 a cutting force detection unit, provided under the worktable, for sensing and transmitting a current cutting force;
 a temperature sensing unit, provided on one side of the milling cutter, for sensing and transmitting a current cutting temperature;
 an ultrasonic drive power supply, for providing power for the wireless transmission transmitting winding unit; and
 a processor, for receiving sensing signals of the cutting force detection unit and the temperature sensing unit, processing the received sensing signals according to a set program, and sending control signals to the ultrasonic drive power supply and a corresponding servo motor, respectively.

Further, the processor includes a first programmable logic controller (PLC) module, a second PLC module and a central processing unit (CPU); an input terminal of the CPU receives a cutting force signal or a temperature signal sent from the cutting force detection unit or the temperature sensing unit, and processes the cutting force signal or the temperature signal according to a set program, to obtain a first digital control signal for controlling an output torque and speed of a corresponding servo motor and a second digital control signal for controlling an output voltage or current of the ultrasonic drive power supply; the first digital control signal and the second digital control signal are respectively transmitted from corresponding output terminals of the CPU to an input terminal of the first PLC module and the second PLC module; the first PLC module and the second PLC module respectively perform digital-to-analog (D/A) conversion on the first control digital signal and the second digital control signal to obtain a first analog control signal and a second analog control signal in correspondence; the first analog control signal and the second analog control signal are respectively transmitted from an output terminal of the first PLC module and the second PLC module to a corresponding servo motor and the ultrasonic drive power supply.

Further, the set program includes:
 1) calculating a change of a cutting force or temperature detected in a set time, to obtain a corresponding cutting force change value $\Delta F$ or temperature change value $\Delta T$;
 2) setting a cutting force change threshold $\Delta F1$ or a temperature change threshold $\Delta T1$;

3) reducing a current speed of the vertical spindle and a current feed rate of the worktable each by 5% when ΔF>ΔF1; and increasing the current speed of the vertical spindle and the current feed rate of the worktable each by 5% when ΔF<ΔF1;

or: reducing the current speed of the vertical spindle and the current feed rate of the worktable each by 5% when ΔT>ΔT1; and increasing the current speed of the vertical spindle and the current feed rate of the worktable each by 5% when ΔF<ΔF1.

Further, the feed motion of the worktable is performed in three-dimensional (3D) directions including X, Y and Z, and is driven by a corresponding servo motor in the respective directions.

Further, a bearing seat is fixed on the frame, and the vertical spindle is rotatably connected in the bearing seat.

Further, the wireless transmission transmitting winding unit at least includes a first toroidal shell and a transmitting winding L1, a first resistor R1 and a first capacitor C1 accommodated in the first toroidal shell; one end of the transmitting winding L1 is sequentially connected in series with the first resistor R1 and the first capacitor C1; at least one end of the first capacitor C1 and the other end of the transmitting winding L1 constitute a power input terminal; the power input terminal is used to connect an output terminal of the ultrasonic drive power supply to obtain required power; a winding structure of the transmitting winding L1 is adapted to a cavity structure of the first toroidal shell; the transmitting winding L1 is fixed, through the first toroidal shell, on the bearing seat that rotatably supports the vertical spindle, and the first toroidal shell is around the connecting shaft.

Further, the wireless transmission receiving winding unit at least includes a second toroidal shell and a receiving winding L2, a second resistor R2 and a second capacitor C2 accommodated in the second toroidal shell; one end of the receiving winding L2 is sequentially connected in series with the second resistor R2 and the second capacitor C2; at least one end of the second capacitor C2 and the other end of the receiving winding L2 constitute a power output terminal of the transducer; the power output terminal is used to connect a power input terminal of the transducer to enable the transducer to obtain required power; at least one end of the second capacitor C2 and a center-tapped end of the receiving winding L2 constitute a power output terminal of the cutter shaft drive motor; the power output terminal is used to connect a power input terminal of the cutter shaft drive motor to enable the cutter shaft drive motor to obtain required power; a winding structure of the receiving winding L2 is adapted to a cavity structure of the second toroidal shell; the receiving winding L2 is fixed on a circumferential side of the connecting shaft through the second toroidal shell.

Further, the second shell is spaced 3-5 mm apart from the first shell located above.

Further, the cutter shaft drive motor includes a motor housing, a stator, a rotor, a wire, a carbon brush, an elastic contact end, an insulating tube and a lead tube; the motor housing is fixed on the connecting shaft; a radial lead slot is provided at a bottom end of the motor housing; the stator is fixed in the motor housing; the rotor is rotatably supported on the motor housing and located at a center of the stator; a rotor shaft of the rotor has a hollow structure; the insulating tube is fixed in the rotor shaft; the lead tube is fixed in the insulating tube; the insulating tube, the rotor and the lead tube are respectively provided with a first mounting hole, a lead hole and a second mounting hole on a side wall corresponding to a radial position of the lead slot; the carbon brush is provided at an inner wall of the insulating tube corresponding to the first mounting hole through the first mounting hole; a leading end of the stator is led out through the lead slot in an insulated manner and electrically connected to the carbon brush; the elastic contact end elastically extends out of the lead tube through the second mounting hole and abuts against the carbon brush; one end of the wire is electrically connected to the elastic contact end, and the other end thereof is led out through the hollow shaft of the cutter shaft drive motor and connected to the wireless transmission receiving winding unit.

Further, the lead tube is made of an insulating material; the second mounting hole on the side wall of the lead tube is a stepped hole including a small hole and a large hole that are coaxial from the outside to the inside; the elastic electrical contact end includes a spring, an electrical contact terminal and a connecting nut; the electrical contact terminal and the connecting nut respectively have a T-shaped structure with a limiting shoulder; the connecting nut passes through the second mounting hole from the small hole to the large hole; the spring is sleeved on the connecting nut in the large hole; the connecting nut is axially provided with a through hole, and the electrical contact terminal is inserted into the through hole; two ends of the spring respectively abut against the stepped hole and the limiting shoulder of the electrical contact terminal, so that the electrical contact terminal extends and abuts against the carbon brush.

The present invention has the following beneficial effects.

1) The present invention effectively avoids the problem of low surface machining accuracy of the workpiece due to a complex curved surfaces, an uneven cutting allowance and rapid tool wear in the existing constant-frequency ultrasonic milling process.

2) By adjusting the ultrasonic vibration frequency or the frequency of a frequency converter of the CNC milling machine in the machining process, the present invention ensures the continuity of the ultrasonic-assisted milling (UAM) of the part with a complex curved surface in the case of uneven cutting allowance, and improves the efficiency of ultrasonic machining.

DETAILED DESCRIPTION

The present invention is described in further detail below with reference to the accompanying drawings.

Figure 1:
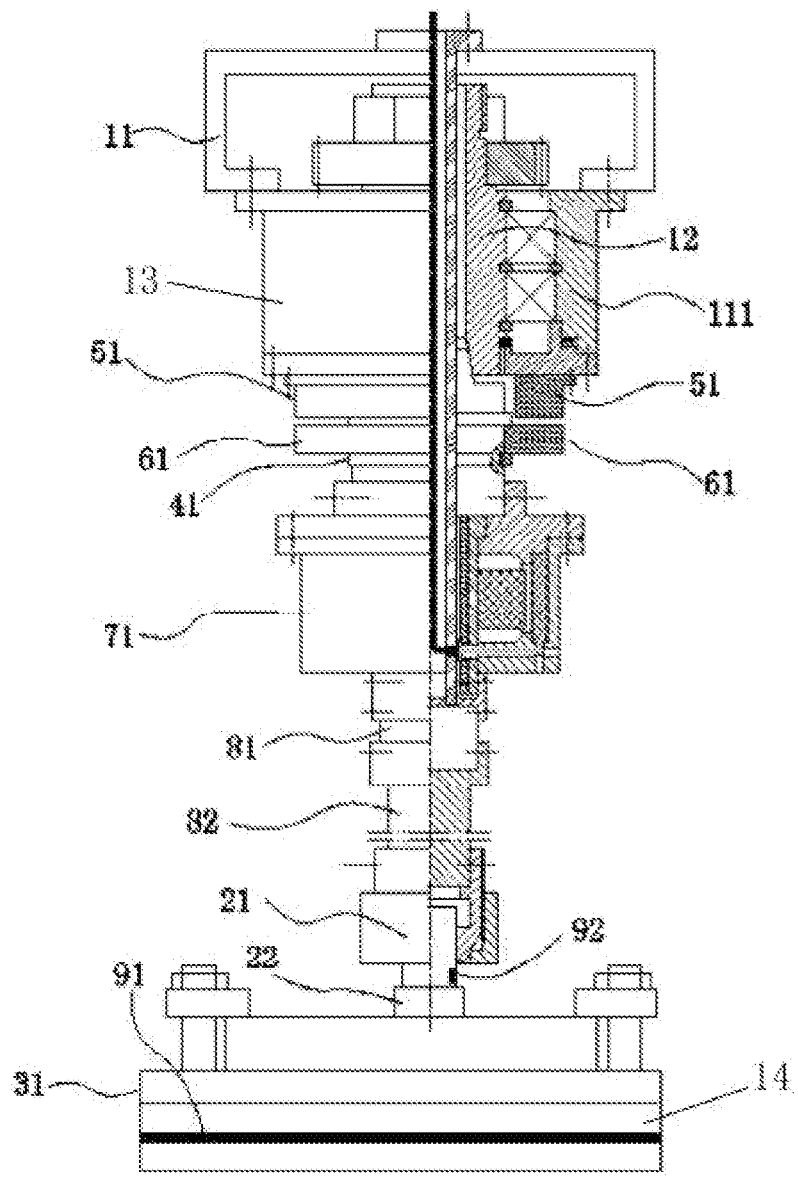
FIG. 1 is a structural diagram of the present invention.
Figure 2:
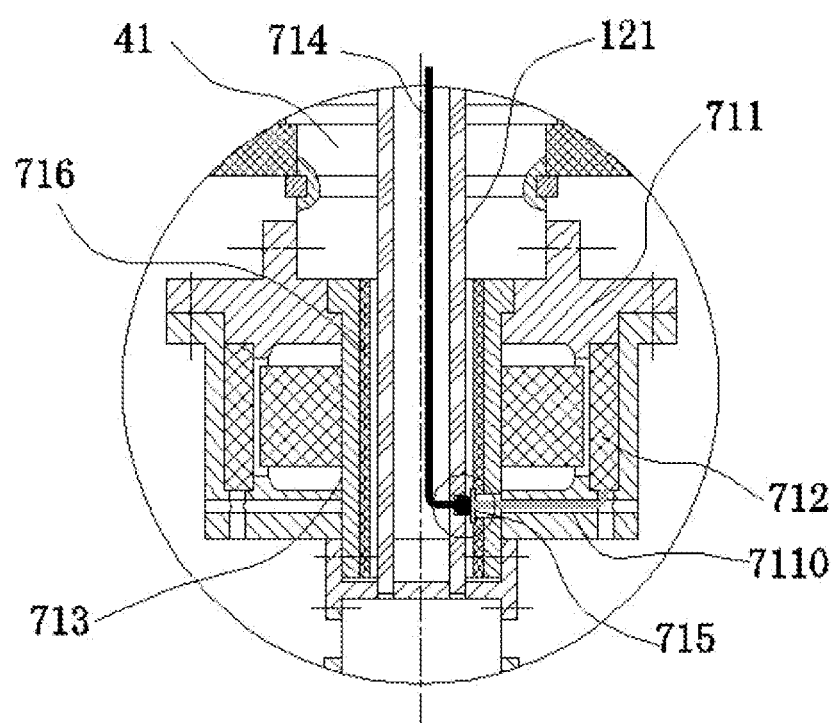
FIGS. 2 and 3 are detail drawings of the present invention.
Figure 3:
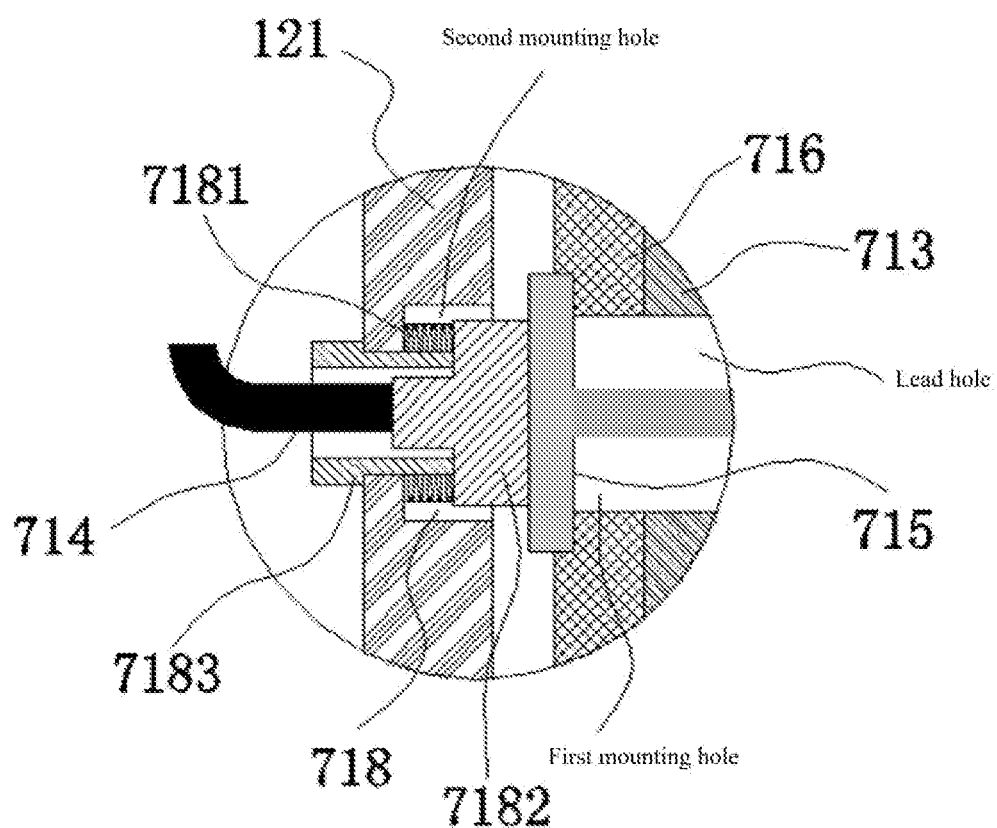
Figure 4:
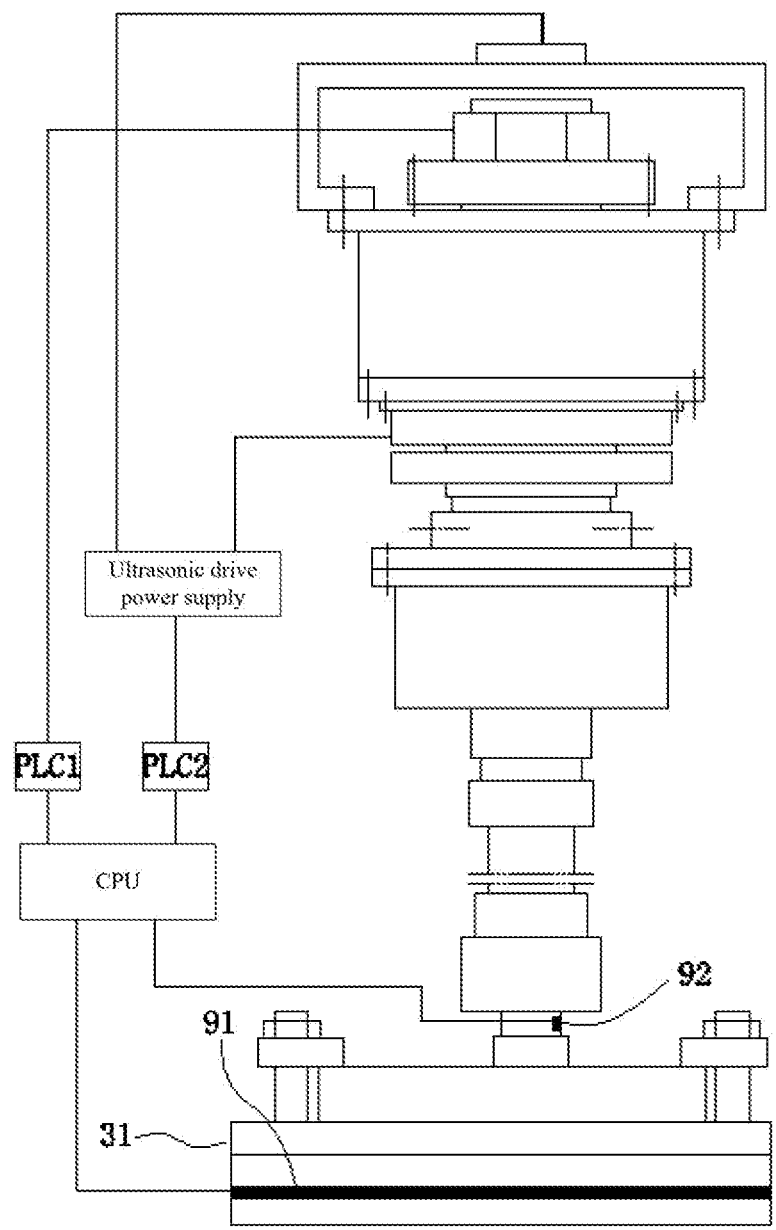
FIG. 4 is a schematic diagram of electrical control of the present invention.
Figure 5:
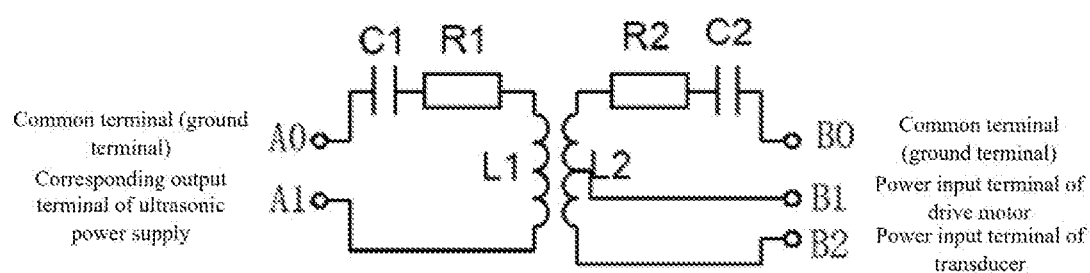
FIG. 5 is a schematic circuit diagram of a wireless transmission transmitting winding unit and a wireless transmission receiving winding unit in the present invention.

As shown in FIGS. 1 to 5, the present invention provides a variable-frequency ultrasonic machining system for a computer numerical control (CNC) milling machine, including a frame 11, a vertical spindle 12, a spindle servo motor 13, a worktable 31, a feed servo motor 14, a milling cutter shaft 21, a milling cutter 22, a connecting shaft 41, a wireless transmission transmitting winding unit 51, a wireless transmission receiving winding unit 61, a cutter shaft drive motor 71, a transducer 81, a horn 82, a cutting force detection unit 91, a temperature sensing unit 92, an ultrasonic drive power supply and a processor.

The vertical spindle 12 is rotatably provided on the frame 11 through a bearing seat 111 fixed to the frame 11. The spindle servo motor drives the vertical spindle 12 to rotate. The worktable 31 is provided below the vertical spindle 12, for clamping a workpiece and performing feed motion in three-dimensional (3D) directions including X, Y and Z. The feed motion in each direction is driven by a servo motor in the corresponding direction. The milling cutter shaft 21 is connected to the vertical spindle 12 through the connecting shaft 41. The milling cutter 22 is connected to the milling cutter shaft 21. The wireless transmission transmitting winding unit 51 is fixed around the connecting shaft 41. The wireless transmission receiving winding unit 61 is connected to the connecting shaft 41 and spaced apart from the transmitting winding unit 51 located above. The cutter shaft drive motor 71 is connected under the wireless transmission receiving winding unit 61.

The cutter shaft drive motor 71 has a hollow shaft. The power of the cutter shaft drive motor 71 is connected from the wireless transmission receiving winding unit 61 and introduced through a cavity of the hollow shaft.

The transducer 81 is connected to the shaft of the cutter shaft drive motor 71. The power of the transducer 81 is connected from the wireless transmission receiving winding unit 61 and introduced through the hollow shaft of the cutter shaft drive motor.

An upper end of the ultrasonic vibration horn 82 is connected to the transducer 81, and a lower end thereof is connected to the milling cutter shaft 21. The horn is used to drive the milling cutter to perform milling by moving relative to the worktable 31 which clamps the workpiece and performs feed motion, and to enable the milling cutter to have a speed that is a sum of speed of the spindle 12 and the cutter shaft drive motor 71. The vibration frequency and corresponding speed of the horn 82 and the feed motion of the worktable 31 are adjusted in real time according to a current cutting force or/and temperature of a machining zone. For example, if the current cutting force or temperature of a machining zone is high, the machining resistance is large, indicating that the corresponding machined surface is complex, and the feed rate, spindle speed and vibration frequency need to be reduced. If the current cutting force or temperature of the machining zone is low, the machining resistance is small, indicating that the corresponding machined surface is simple, and the feed rate, spindle speed and vibration frequency can be appropriately increased. The present invention senses the current cutting force and temperature in real time through the cutting force detection unit 91 and the temperature sensing unit 92, and adjusts the speed, feed and vibration frequency in real time to adapt to the current machining conditions.

The adjustment of the vibration frequency of the horn 82 is achieved by adjusting an input voltage or current of the ultrasonic drive power supply, which is used to provide power for the wireless transmission transmitting winding unit 51. In the present invention, since the speed of the horn is the sum of speed of the spindle 12 and the cutter shaft drive motor 71, the speed of the spindle 12 can be reduced under the prerequisite of a set speed, so as to reduce the extra vibration of the vertical spindle due to high-speed rotation. In this way, the adjusted frequency of the ultrasonic vibration power supply is closer to the frequency and amplitude required for ultrasonic machining, thereby ensuring the machining quality.

In this example, the cutting force detection unit 91 is provided under the worktable 31. The worktable 31 is provided below the vertical spindle 12. The temperature sensing unit 92 is provided on one side of the milling cutter 22. In the machining of a workpiece with a complex curved surface in the case of an uneven cutting allowance and fast tool wear, the two units can sense the cutting force or temperature in a timely manner and transmit the detected data to the processor synchronously. The processor receives sensing signals of the cutting force detection unit 91 and the temperature sensing unit 92, processes the received sensing signals according to a set program, and sends control signals to the ultrasonic drive power supply and corresponding servo motors (such as the spindle servo motor and the feed servo motor that drives the worktable to perform feed motion) respectively to adjust the input voltage or current of the ultrasonic drive power supply and the speed of the corresponding servo motors accordingly.

The processor includes a first programmable logic controller (PLC) module (PLC1), a second PLC module (PLC2) and a central processing unit (CPU). An input terminal of the CPU receives a cutting force signal and a temperature signal sent from the cutting force detection unit 91 and the temperature sensing unit 92, and processes the cutting force signal and the temperature signal according to a set program, to obtain a first digital control signal for controlling an output torque and speed of a corresponding servo motor and a second digital control signal for controlling an output voltage or current of the ultrasonic drive power supply.

The first digital control signal and the second digital control signal are respectively transmitted from corresponding output terminals of the CPU to an input terminal of the first PLC module and the second PLC module. The first PLC module and the second PLC module respectively perform digital-to-analog (D/A) conversion on the first control digital signal and the second digital control signal to obtain a first analog control signal and a second analog control signal in correspondence. The first analog control signal and the second analog control signal are respectively transmitted from an output terminal of the first PLC module and the second PLC module to a corresponding servo motor and the ultrasonic drive power supply.

The processor processes the received data according to a set program, and when a value reaches a predetermined threshold, the processor sends an adjustment command to the ultrasonic drive power supply or the corresponding servo motor to adjust the vibration frequency of the horn 82 by controlling the input voltage or current of the ultrasonic drive power supply and adjust the spindle speed and feed by controlling the speed of the corresponding servo motor. Therefore, the ultrasonic-assisted milling (UAM) machining equipment of the present invention can perform continuous high-speed machining of parts with complex curved surfaces and uneven cutting allowances, thereby improving machining efficiency and reducing the production cost.

For example, if the adjustment is made based on the temperature sensing signal, the temperature sensing unit uses an infrared thermal imager. The infrared thermal imager measures the temperature T of the cutting zone of the CNC milling machine in real time, compares the measured temperature with a cutting temperature threshold $\Delta T$ of the current time period and a standard machining temperature change threshold $\Delta T1$ set based on the material of the workpiece in real time, and performs gradient adjustment according to the comparison result. Specifically, the set program is as follows:

When $\Delta T>\Delta T1$, the processor outputs compensation information, and controls the CNC milling machine to reduce its speed and feed by 5% per time, 30 s as a cycle, and controls the ultrasonic drive power supply to reduce its input voltage by 5% per time.

When $\Delta T=\Delta T1$, the processor stops outputting compensation information, and the CNC milling machine maintains the current state to perform machining.

When $\Delta T<\Delta T1$, the processor outputs compensation information, and controls the CNC milling machine to increase the speed and feed by 5% per time, and controls the ultrasonic drive power supply to increase the input voltage by 5% per time.

If the adjustment is made based on the cutting force sensing signal, the cutting force detection unit uses a resistance strain gauge. The resistance strain gauge detects a change in a stress of a tool bar in real time (the detected stress of the tool bar is used as the cutting force), compares the detected cutting force with a cutting force change threshold $\Delta F$ of the current time period in real time, and performs gradient adjustment according to the comparison result. Specifically, the set program is as follows:

When $\Delta F>\Delta F1$, the current speed of the vertical spindle and the current feed of the worktable are reduced by 5%, respectively.

When $\Delta F<\Delta F1$, the current speed of the vertical spindle and the current feed of the worktable are increased by 5%, respectively.

In the present invention, the wireless transmission transmitting winding unit 51 at least includes a first toroidal shell and a transmitting winding L1, a first resistor R1 and a first capacitor C1 accommodated in the first toroidal shell. One end of the transmitting winding L1 is sequentially connected in series with the first resistor R1 and the first capacitor C1. At least one end of the first capacitor C1 and the other end of the transmitting winding L1 constitute a power input terminal. The power input terminal is used to connect the output terminal of the ultrasonic drive power supply to obtain required power.

A winding structure of the transmitting winding L1 is adapted to a cavity structure of the first toroidal shell. The transmitting winding L1 is fixed on the bearing seat (which rotatably supports the vertical spindle 12) through the first toroidal shell, and the first toroidal shell is around the connecting shaft 41.

The wireless transmission receiving winding unit 61 unit at least includes a second toroidal shell and a receiving winding L2, a second resistor R2 and a second capacitor C2 accommodated in the second toroidal shell. One end of the receiving winding L2 is sequentially connected in series with the second resistor R2 and the second capacitor C2. At least one end of the second capacitor C2 and the other end of the receiving winding L2 constitute a power output terminal of the transducer. The power output terminal is used to connect a power input terminal of the transducer to enable the transducer to obtain required power. At least one end of the second capacitor C2 and a center-tapped end of the receiving winding L2 constitute a power output terminal of the cutter shaft drive motor. The power output terminal is used to connect a power input terminal of the cutter shaft drive motor to enable the cutter shaft drive motor to obtain required power. A winding structure of the receiving winding L2 is adapted to a cavity structure of the second toroidal shell. The receiving winding L2 is fixed on a circumferential side of the connecting shaft through the second toroidal shell, and the second shell is spaced 3-5 mm apart from the first shell located above. In this way, it is ensured that the transmitting winding L1 and the receiving winding unit 61 have good electromagnetic transmission efficiency.

In the present invention, the cutter shaft drive motor 71 includes a motor housing 711, a stator 712, a rotor 713, a wire 714, a carbon brush 715, an elastic contact end 718, an insulating tube 716 and a lead tube 121. The motor housing 711 is fixed on the connecting shaft 41. A radial lead slot 7110 is provided at a bottom end of the motor housing 711. The stator 712 is fixed in the motor housing 711. The rotor 713 is rotatably supported on the motor housing 711 and located at a center of the stator 712.

A rotor shaft of the rotor 713 has a hollow structure. The insulating tube 716 is fixed in the rotor shaft. The lead tube 121 is fixed in the insulating tube 716. The insulating tube 716, the rotor 713 and the lead tube 121 are respectively provided with a first mounting hole, a lead hole and a second mounting hole on a side wall corresponding to a radial position of the lead slot 7110. The carbon brush 715 is provided at an inner wall of the insulating tube 716 corresponding to the first mounting hole through the first mounting hole. A leading end of the stator 712 is led out through the lead slot 7110 in an insulated manner and electrically connected to the carbon brush 715. The elastic contact end 718 elastically extends out of the lead tube 121 through the second mounting hole and abuts against the carbon brush 715. One end of the wire 714 is electrically connected to the elastic contact end 718, and the other end thereof is led out through the hollow shaft of the cutter shaft drive motor 71 and connected to the wireless transmission receiving winding unit 61.

The lead tube 121 is made of an insulating material to ensure an insulating effect. The second mounting hole on the side wall of the lead tube 121 is a stepped hole including a small hole and a large hole that are coaxial from the outside to the inside.

The elastic electrical contact end 718 includes a spring 7181, an electrical contact terminal 7182 and a connecting nut 7183. The electrical contact terminal 7182 and the connecting nut 7183 respectively have a T-shaped structure with a limiting shoulder. The connecting nut 7183 passes through the second mounting hole from the small hole to the large hole. The spring 7181 is sleeved on the connecting nut in the large hole. The connecting nut 7183 is axially provided with a through hole, and the electrical contact terminal 7182 is inserted into the through hole. Two ends of the spring 7181 respectively abut against the stepped hole and the limiting shoulder of the electrical contact terminal 7182, so that the electrical contact terminal extends and abuts against the carbon brush 715.

The connecting nut 7183 is threaded on the lead tube 121. The electrical contact terminal 7182 penetrates through the connecting nut 7183, and is guided by the hole in the axial direction of the connecting nut 7183. The wire 714 is connected to the electrical contact terminal 7182. The spring 7181 is directly sleeved on the connecting nut 7183. It is avoided that the spring 7181 is directly sleeved on the electrical contact terminal 7182, so that in actual production, the volume of the electrical contact terminal 7182 is reduced, and the structural material of the electrical contact terminal 7182 is saved.

The above described are merely preferred implementations of the present invention. It should be noted that for a person of ordinary skill in the art, several improvements may further be made without departing from the principle of the present invention, but such improvements should also be deemed as falling within the protection scope of the present invention.

The invention claimed is:

1. A variable-frequency ultrasonic machining system for a computer numerical control (CNC) milling machine, comprising:
   a frame;
   a vertical spindle, rotatably provided on the frame;
   a spindle servo motor, for driving the vertical spindle;
   a worktable, provided below the vertical spindle, for clamping a workpiece and driving the workpiece to perform feed motion;
   a feed servo motor, for driving the worktable to perform the feed motion;
   a milling cutter shaft; and
   a milling cutter connected to the milling cutter shaft;
   wherein, the variable-frequency ultrasonic machining system further comprises:
   a connecting shaft, connected to the vertical spindle;
   a wireless transmission transmitting winding unit, fixed around the connecting shaft;
   a wireless transmission receiving winding unit, connected to the connecting shaft, and spaced apart from the wireless transmission transmitting winding unit located above;
   a cutter shaft drive motor, connected under the wireless transmission receiving winding unit and having a hollow shaft, wherein power of the cutter shaft drive motor is connected from the wireless transmission receiving winding unit and introduced through a cavity of the hollow shaft;
   a transducer, connected to the shaft of the cutter shaft drive motor, wherein power of the transducer is connected from the wireless transmission receiving winding unit and introduced through the hollow shaft of the cutter shaft drive motor;
   a horn, wherein an upper end of the horn is connected to the transducer, and a lower end thereof is connected to the milling cutter shaft;
   a cutting force detection unit, provided under the worktable, for sensing and transmitting a current cutting force;
   a temperature sensing unit, provided on one side of the milling cutter, for sensing and transmitting a current cutting temperature;
   an ultrasonic drive power supply, for providing power for the wireless transmission transmitting winding unit; and
   a processor, for receiving sensing signals of the cutting force detection unit and the temperature sensing unit, processing the received sensing signals according to a set program, and sending control signals to the ultrasonic drive power supply and a corresponding servo motor, respectively;
   wherein the processor comprises:
   a first programmable logic controller (PLC) module;
   a second PLC module; and
   a central processing unit (CPU), wherein
   an input terminal of the CPU receives a cutting force signal or a temperature signal sent from the cutting force detection unit or the temperature sensing unit, and processes the cutting force signal or the temperature signal according to a set program, to obtain a first digital control signal for controlling an output torque and speed of a corresponding servo motor and a second digital control signal for controlling an output voltage or current of the ultrasonic drive power supply;
   the first digital control signal and the second digital control signal are respectively transmitted from corresponding output terminals of the CPU to an input terminal of the first PLC module and the second PLC module;
   the first PLC module and the second PLC module respectively perform digital-to-analog (D/A) conversion on the first control digital signal and the second digital control signal to obtain a first analog control signal and a second analog control signal in correspondence; and
   the first analog control signal and the second analog control signal are respectively transmitted from an output terminal of the first PLC module and the second PLC module to a corresponding servo motor and the ultrasonic drive power supply.

2. The variable-frequency ultrasonic machining system for a CNC milling machine according to claim 1, wherein the set program comprises:
   1) Calculating a change of a cutting force or temperature detected in a set time, to obtain a corresponding cutting force change value $\Delta F$ or temperature change value $\Delta T$;
   2) Setting a cutting force change threshold $\Delta F1$ or a temperature change threshold $\Delta T1$;
   3) Reducing a current speed of the vertical spindle and a current feed rate of the worktable each by 5% when $\Delta F > \Delta F1$; and
   increasing the current speed of the vertical spindle and the current feed rate of the worktable each by 5% when $\Delta F < \Delta F1$;
   or: reducing the current speed of the vertical spindle and the current feed rate of the worktable each by 5% when $\Delta T > \Delta T1$; and
   increasing the current speed of the vertical spindle and the current feed rate of the worktable each by 5% when $\Delta F < \Delta F1$.

3. The variable-frequency ultrasonic machining system for a CNC milling machine according to claim 2, wherein the feed motion of the worktable is performed in three-dimensional (3D) directions comprising X, Y and Z, and is driven by a corresponding servo motor in the respective directions.

4. The variable-frequency ultrasonic machining system for a CNC milling machine according to claim 2, wherein a bearing seat is fixed on the frame, and the vertical spindle is rotatably connected in the bearing seat.

5. The variable-frequency ultrasonic machining system for a CNC milling machine according to claim 4, wherein the wireless transmission transmitting winding unit comprises a first toroidal shell and a transmitting winding, a first resistor and a first capacitor accommodated in the first toroidal shell;
   one end of the transmitting winding is sequentially connected in series with the first resistor and the first capacitor;
   at least one end of the first capacitor and the other end of the transmitting winding constitute a power input terminal;
   the power input terminal is used to connect an output terminal of the ultrasonic drive power supply to obtain required power;
   a winding structure of the transmitting winding is adapted to a cavity structure of the first toroidal shell;
   the transmitting winding is fixed, through the first toroidal shell, on the bearing seat that rotatably supports the vertical spindle, and the first toroidal shell is around the connecting shaft.

6. The variable-frequency ultrasonic machining system for a CNC milling machine according to claim 5, wherein the wireless transmission receiving winding unit comprises a second toroidal shell and a receiving winding, a second resistor and a second capacitor accommodated in the second toroidal shell;

one end of the receiving winding is sequentially connected in series with the second resistor and the second capacitor;

at least one end of the second capacitor and the other end of the receiving winding constitute a power output terminal of the transducer;

the power output terminal is used to connect a power input terminal of the transducer to enable the transducer to obtain required power;

at least one end of the second capacitor and a center-tapped end of the receiving winding constitute a power output terminal of the cutter shaft drive motor;

the power output terminal is used to connect a power input terminal of the cutter shaft drive motor to enable the cutter shaft drive motor to obtain required power;

a winding structure of the receiving winding is adapted to a cavity structure of the second toroidal shell;

the receiving winding is fixed on a circumferential side of the connecting shaft through the second toroidal shell.

7. The variable-frequency ultrasonic machining system for a CNC milling machine according to claim 6, wherein the second shell is spaced 3-5 mm apart from the first shell located above.

8. The variable-frequency ultrasonic machining system for a CNC milling machine according to claim 1, wherein the feed motion of the worktable is performed in three-dimensional (3D) directions comprising X, Y and Z, and is driven by a corresponding servo motor in the respective directions.

9. The variable-frequency ultrasonic machining system for a CNC milling machine according to claim 1, wherein a bearing seat is fixed on the frame, and the vertical spindle is rotatably connected in the bearing seat.

10. The variable-frequency ultrasonic machining system for a CNC milling machine according to claim 9, wherein the wireless transmission transmitting winding unit comprises:

a first toroidal shell and a transmitting winding, a first resistor and a first capacitor accommodated in the first toroidal shell;

one end of the transmitting winding is sequentially connected in series with the first resistor and the first capacitor;

at least one end of the first capacitor and the other end of the transmitting winding constitute a power input terminal;

the power input terminal is used to connect an output terminal of the ultrasonic drive power supply to obtain required power;

a winding structure of the transmitting winding is adapted to a cavity structure of the first toroidal shell;

the transmitting winding is fixed, through the first toroidal shell, on the bearing seat that rotatably supports the vertical spindle, and the first toroidal shell is around the connecting shaft.

11. The variable-frequency ultrasonic machining system for a CNC milling machine according to claim 10, wherein the wireless transmission receiving winding unit comprises a second toroidal shell and a receiving winding, a second resistor and a second capacitor accommodated in the second toroidal shell;

one end of the receiving winding is sequentially connected in series with the second resistor and the second capacitor;

at least one end of the second capacitor and the other end of the receiving winding constitute a power output terminal of the transducer;

the power output terminal is used to connect a power input terminal of the transducer to enable the transducer to obtain required power;

at least one end of the second capacitor and a center-tapped end of the receiving winding constitute a power output terminal of the cutter shaft drive motor;

the power output terminal is used to connect a power input terminal of the cutter shaft drive motor to enable the cutter shaft drive motor to obtain required power;

a winding structure of the receiving winding is adapted to a cavity structure of the second toroidal shell;

the receiving winding is fixed on a circumferential side of the connecting shaft through the second toroidal shell.

12. The variable-frequency ultrasonic machining system for a CNC milling machine according to claim 11, wherein the second shell is spaced 3-5 mm apart from the first shell located above.

13. The variable-frequency ultrasonic machining system for a CNC milling machine according to claim 10, wherein the cutter shaft drive motor comprises a motor housing, a stator, a rotor, a wire, a carbon brush, an elastic contact end, an insulating tube and a lead tube;

the motor housing is fixed on the connecting shaft; a radial lead slot is provided at a bottom end of the motor housing;

the stator is fixed in the motor housing;

the rotor is rotatably supported on the motor housing and located at a center of the stator;

a rotor shaft of the rotor has a hollow structure;

the insulating tube is fixed in the rotor shaft;

the lead tube is fixed in the insulating tube;

the insulating tube, the rotor and the lead tube are respectively provided with a first mounting hole, a lead hole and a second mounting hole on a side wall corresponding to a radial position of the lead slot;

the carbon brush is provided at an inner wall of the insulating tube corresponding to the first mounting hole through the first mounting hole;

a leading end of the stator is led out through the lead slot in an insulated manner and electrically connected to the carbon brush;

the elastic contact end elastically extends out of the lead tube through the second mounting hole and abuts against the carbon brush;

one end of the wire is electrically connected to the elastic contact end, and the other end thereof is led out through the hollow shaft of the cutter shaft drive motor and connected to the wireless transmission receiving winding unit.

14. The variable-frequency ultrasonic machining system for a CNC milling machine according to claim 13, wherein the lead tube is made of an insulating material;

the second mounting hole on the side wall of the lead tube is a stepped hole comprising a small hole and a large hole that are coaxial from the outside to the inside;

the elastic electrical contact end comprises a spring, an electrical contact terminal and a connecting nut;

the electrical contact terminal and the connecting nut respectively have a T-shaped structure with a limiting shoulder;

the connecting nut passes through the second mounting hole from the small hole to the large hole;

the spring is sleeved on the connecting nut in the large hole;

the connecting nut is axially provided with a through hole, and the electrical contact terminal is inserted into the through hole;

two ends of the spring respectively abut against the stepped hole and the limiting shoulder of the electrical contact terminal, so that the electrical contact terminal extends and abuts against the carbon brush.

* * * * *